T. C. CRAVEN.
HAY SPREADER.
No. 3,250. Reissued Jan. 5, 1869.
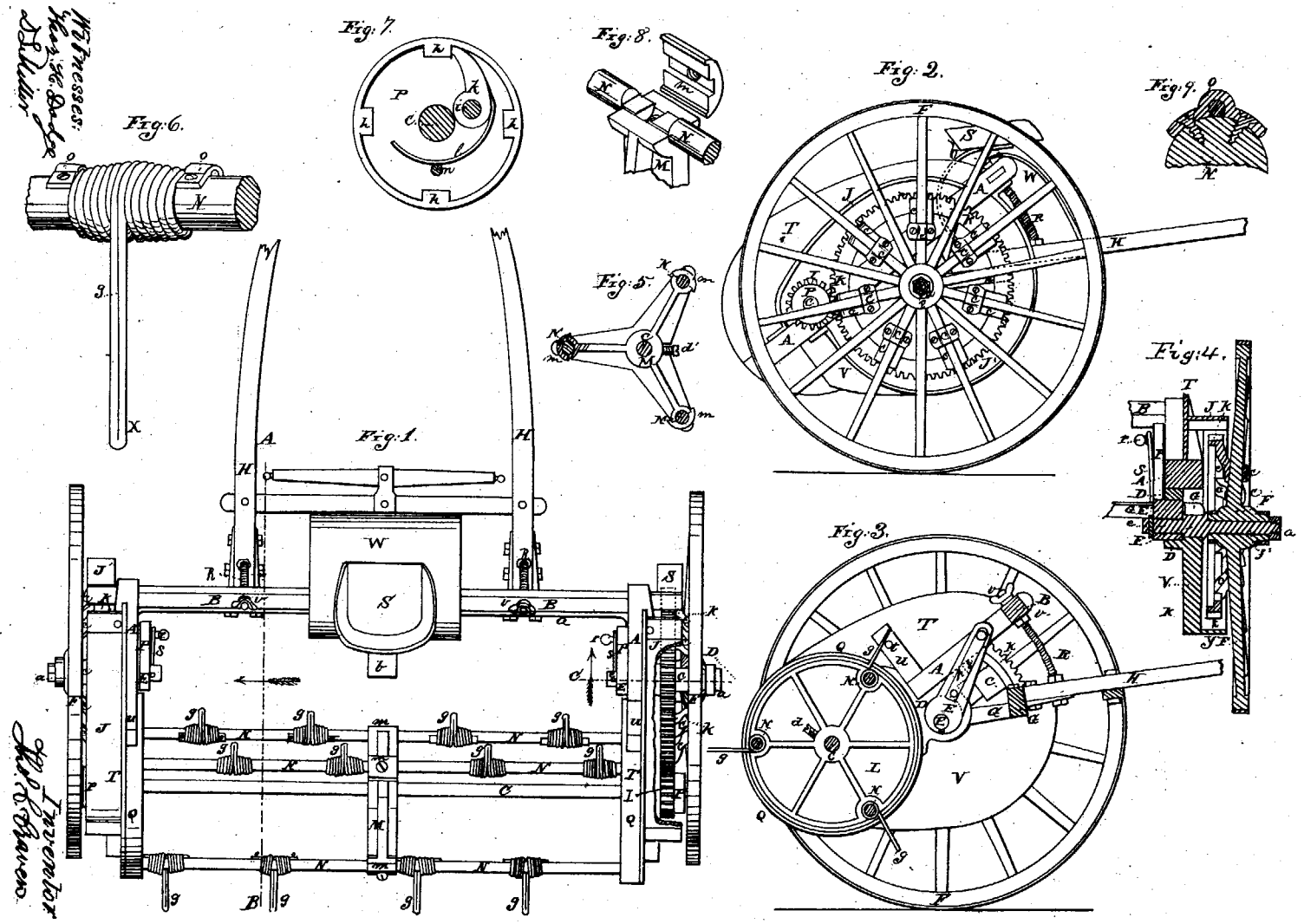

United States Patent Office.

THOMAS C. CRAVEN, OF ALBANY, NEW YORK.

*Letters Patent No.* 84,800, *dated December* 8, 1868; *reissue No.* 3,250, *dated January* 5, 1869.

IMPROVEMENT IN HAY-SPREADERS.

The Schedule referred to in these Letters Patent and making part of the same.

*To all whom it may concern:*

Be it known that I, THOMAS C. CRAVEN, of Albany, county of Albany, and State of New York, did invent certain new and useful Improvements in Hay-Tedders, of which the following is a full, clear, and exact description, reference being had to the accompanying drawing, making a part of this specification, in which—

Figure 1 represents a plan view of my improved hay-tedder;

Figure 2 is a side view of the same;

Figure 3 represents a section on line A B, fig. 1;

Figure 4 represents a section through the wheel and axle on line C D, fig. 1;

Figure 5 is a side view of the three-armed central support for the bars of the reel, the end of one of the arms being shown in section;

Figure 6 is a perspective view of one of the spring-teeth, showing also the manner in which said teeth are secured to the bars of the reel;

Figure 7 shows the construction of the backing-ratchet;

Figure 8 is a perspective view of the end of one of the arms of the central reel-bar support, showing the cap removed, and the bars placed in position; and Figure 9 shows, in section, one of the clasps by which the teeth are secured to the reel-bars.

To enable those skilled in the art to which my invention belongs, to make and use the same, I will proceed to describe the same in detail.

The frame of my improved hay-tedder is composed of two side-rails, A, joined at their forward ends by a cross-piece, B, and near their rear ends is placed shaft C of the reel, extending from one to the other, parallel to the cross-piece B.

To the lower side of rail A, at or near midway of their length, are fastened metallic bearings or boxes D, and through said bearings pass eccentrics E′, which are hung and swing upon the inner ends of the axles E, or upon journals *e* formed thereon.

A short axle is used at each side of the machine, instead of one extending from side to side.

These axles are provided at their inner ends with the journals *e*, upon which the eccentrics E′ are mounted, and their outer ends with journals, *f*, for the wheels F.

The two axles are joined by metallic bar G, which extends across from side to side at the front of the machine, and has its ends turned back and rigidly connected to the axles E, at a point intermediate between the journals *e* and *f*.

On the top of bar G is bolted the transom G′, to which the thills H, or pole, are attached.

At the inner sides of the wheels F are gears K, into which mesh pinions I on the ends of the reel-shaft C.

The gears K are secured to the spokes of the wheels F, by means of short arms or projections *c*, fastened to the rims of the gears K, and having in their ends grooves or channels that fit the spokes at the inner sides of the wheels, where they are held by cap-plates *c*′, fitting in like manner the outer sides of the spokes, and firmly clamped to the arms by screws or bolts.

Across the rear of the frame is placed the reel, the construction of the reel being as follows:

Upon the shaft C, at the inner sides of the rail A, are placed circular heads or disks L, secured to the shaft C by screws *d*. The heads or disks are of metal, and are cast with strengthening-arms and rims, and are provided, near the latter, with sockets to receive the ends of the reel-bars N.

Midway between the heads L, upon shaft C, and secured thereto, is placed a three-armed support, M, from the arms of which to the heads L, extend the wooden bars N, to which the spring-teeth *g*, which stir the hay, are secured The ends of the bars N are flattened at one side, as shown in fig. 8, and are secured at their outer ends to the heads L, by being inserted in sockets of corresponding form in the heads at or near their periphery.

The inner ends of bars N are secured in grooves formed for their reception in the ends of the arms of the central support M, by means of cap-plates *m*, resting upon the flattened sides or faces of the bars, and secured by means of a single screw or bolt passing through the cap and into the end of the arm, between the ends of the bars N, as shown in the drawings. The reel is thus provided at its circumference with three divided bars, arranged at equal distances apart, which give to it a triangular form, which has been found in practice to be best adapted to the work required of it, as, by such construction, a small and very light reel may be used, while the relation of the bars to each other is such as to prevent the hay, operated upon by the teeth on one of the bars, from becoming caught by and wound upon the other bars, while at the same time the necessity for the high speed consequent upon the use of a lesser number of bars is avoided.

The teeth *g* are made of wire, which is doubled to form the teeth, and has its ends coiled right and left, the coils diminishing in diameter as they recede in opposite directions from the tooth, in such manner as to give to the two coils a double conical form, the two cones being joined at the base, or tooth. The ends of the wires are bent outward, and are secured to the bars N of the reel, by means of two grooved clasps, *o*, by the removal of either one of which the teeth can be taken off and replaced when desired.

By the construction of the spring-teeth in the manner described, it will be seen that said tooth and the inner coils of the spring are removed from contact with the bars or heads N, and the relative arrangement of the several coils is such that when the teeth are pressed back, the coils farthest from the teeth are the first to close upon the head or bar, in such manner as to utilize the full amount of elasticity of each coil. This would not be the case were all the coils of the same size, as, in such case, the coils nearest the teeth would be the first to close upon the bar, thereby preventing the free action of the remaining coils. Thus it will be seen that with the conical springs the teeth will stand rougher usage, and will yield farther without injury, than they would were the coils of the spring of equal diameters.

The shaft of the reel is supported upon the side-rail A by suitable bearings, and the pinions I are placed loosely upon the opposite ends of said shaft, just outside the rails, and are connected with the shaft, for giving motion thereto in the forward movement of the machine, by means of the backing-ratchets, shown in fig. 7.

To the ends of shaft C, outside the pinion I, are fastened metallic caps P, having upon the inner sides of their rims four lugs or projections *h*, and, pivoted to the outer sides of the pinions I by pins *i*, are pawls *k*, which work inside the caps P.

To the backs of the pawls *k* are fastened flat springs *l*, which rest against pins *n*, on the sides of pinions I. In the forward motion of the machine, the springs *l* cause the pawls *k* to engage with the lugs on the rim of the caps, thereby turning the shaft and operating the reel; but when the machine is backed, the pawls slip by the lugs, and the reel remains stationary.

Circular guards or bands Q, fastened to the side-rails A and partitions or guard-boards T and V, surround the reel-heads or disks L, and serve to prevent the hay or other material operated upon from being caught by and wound upon the shaft between the head and bearings.

The eccentrics E′ have arms or levers *p* attached to them, by which they are operated to throw the reel into and out of gear.

Springs *s* are fastened to the arms *p*, and are provided at their outer ends with pins *r*, which pass through the ends of arms *p* into holes in the side-rails A, for holding the eccentric when the reel is in gear. By moving the arms back, the reel is thrown out of gear, and may be so held, when desired, by placing the pins *r* in holes *t*, in the block or standards *u*, on side-rails A.

Boards T, upon the top of the side-rails A, and boards V, underneath said rails, form partitions to prevent the hay from being thrown against the wheels, and guards J′, arranged beneath gears K and I, serve to prevent any hay or other substance from being caught in the gearing. An additional guard, J, may be used above the gears, if desired, for further enclosing the gearing.

The frame A, stiffened and strengthened by the side-boards T and V, and by the hoop Q and guard J′, as shown and described, may be made very light, and still be strong enough to carry upon its rear end the reel, with its driving-shaft, pinion, and clutch, without other support than the pins or journals *e*, upon which it hangs, and upon which it is free to turn for the purpose of effecting the adjustment of the height of the reel, without disturbing the relation of the driving-gear.

The height of the reel is regulated by screws R, (curved in the arc of a circle, of which the journals *e* are the centre,) attached to the thills, and extending upward and passing through the cross-piece B of frame A, which is adjusted thereon by means of nuts *v v′*. In lieu of screws R, curved perforated standards may be used, in connection with perforated slides attached to the frame and working on the standards, the frame being held at any desired adjustment by pins passing through the holes in the slides and standards.

A seat, S, for the driver is placed above the cross-bar G, being attached thereto, and supported at a convenient height by a spring, *b*.

Extending upward from the cross-bar of the thills, and curved back beneath the seat S, is an apron or guard, W, which may be made of metal or any other suitable material, to prevent the ends of the reins, or any part of the driver's clothing, from being caught, either by the teeth of the tedder or by projections upon the ground, and also to prevent stones or other hard substances from being thrown against the driver's limbs.

The cross-piece B of the frame may be dispensed with, if preferred, and the screws R, or regulating-devices, may be placed at the ends of side-rails A, with their lower ends attached to parts or extensions of the frame beneath.

The guard or shield W may be attached in a different manner from that above described, and still answer the same purpose.

The operation of my improved hay-tedder is as follows:

The horse being hitched into the thills, the driver takes his place upon the seat S; the arms *p* of the eccentrics E′ are brought forward, and held by pins *r* to the rails A, as shown in the drawing, whereby the reel is thrown into gear; then, as the machine is drawn forward, the reel is caused to revolve rapidly in a direction opposite to the movement of the wheels F, and the hay, picked up by the teeth of the revolving reel, is carried up over the reel and thrown into the air and behind the machine, and is thoroughly shaken up and turned in the operation.

Having described my improved hay-tedder,

What I claim as new, and desire to secure by Letters Patent, is—

1. The combination, with the ends of the central support M and caps *m*, of the bars N, substantially as and for the purpose set forth.

2. The combination of the bars N, having irregular-shaped ends, with the heads or disks L and central support M, substantially as and for the purpose set forth.

3. The combination of the caps *m* with the central support M, substantially as and for the purpose set forth.

4. The combination, with the frame or bearings which support the reel-shaft, of the eccentrics E′, substantially as and for the purpose set forth.

5. The combination, with the eccentrics E′ and side-rails A, or their equivalents, of the arms *p*, springs *s*, and pins *r*, substantially as and for the purpose set forth.

6. The combination of the driving-gears K with the wheels F, substantially as and for the purpose set forth.

7. The combination, with the frame which supports the reels and the frame which connects the journals of the wheels F, of adjusting-screw R and nuts *v v′*, substantially as and for the purpose set forth.

8. The combination, with the frame of the machine and the driver's seat, of a metallic or other suitable guard or shield, W, arranged substantially as and for the purpose set forth.

9. The employment, in a hay-tedder, of a triangular or three-barred reel, substantially as and for the purpose set forth.

10. A double-wire spring-tooth, provided with the two conical coiled springs, arranged and operating substantially as described.

11. The boards T and V, in combination with the hoop Q and guard J′, arranged substantially as and for the purpose set forth.

12. The boards T and V, bands or hoop Q, and guards J′, in combination with the vibrating frame A, all suspended upon the inner ends or journals *e* of short axles E, substantially as and for the purpose set forth.

13. The grooved clasps or fastenings *o o*, in combination with the double-coiled spring-teeth, for securing said teeth to the bars N, as described.

THOS. C. CRAVEN.

Witnesses:

JOSEPH DICK, Jr.,
ALEX. MAHON.